March 23, 1965 M. O. MILES 3,174,708

ROTARY WING AIRCRAFT CONTROL SYSTEM

Filed Aug. 28, 1961 5 Sheets-Sheet 1

*INVENTOR.*
MELVIN O. MILES
BY
ATTORNEY

March 23, 1965  M. O. MILES  3,174,708
ROTARY WING AIRCRAFT CONTROL SYSTEM
Filed Aug. 28, 1961  5 Sheets-Sheet 2
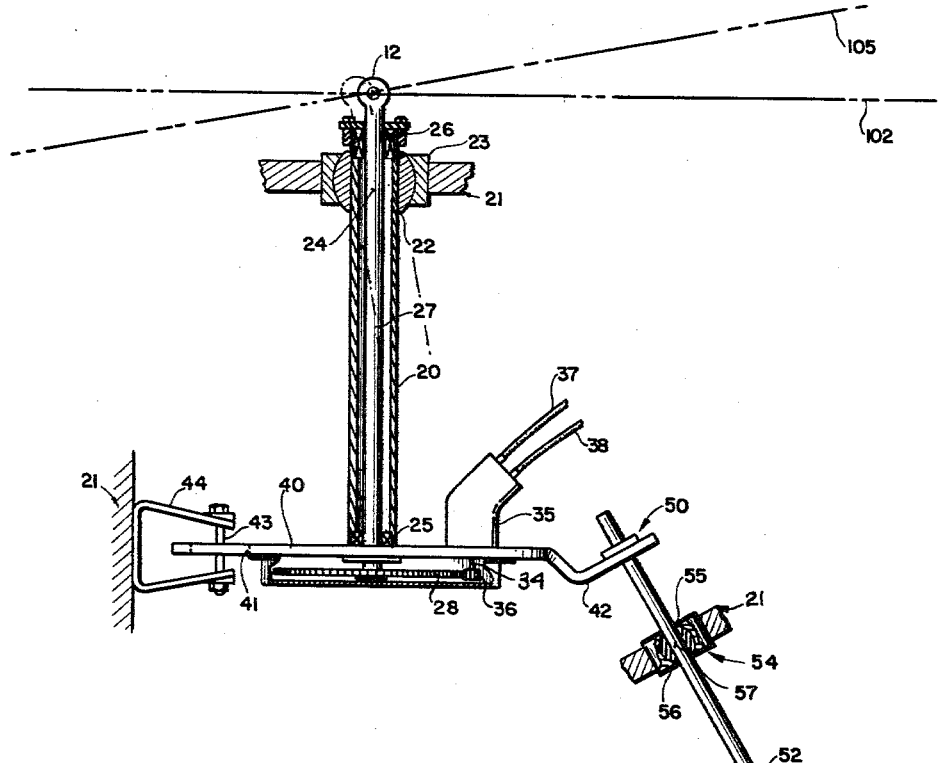
FIG. 2a
INVENTOR.
MELVIN O. MILES
BY 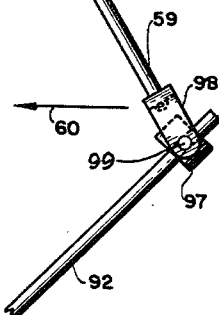
ATTORNEY

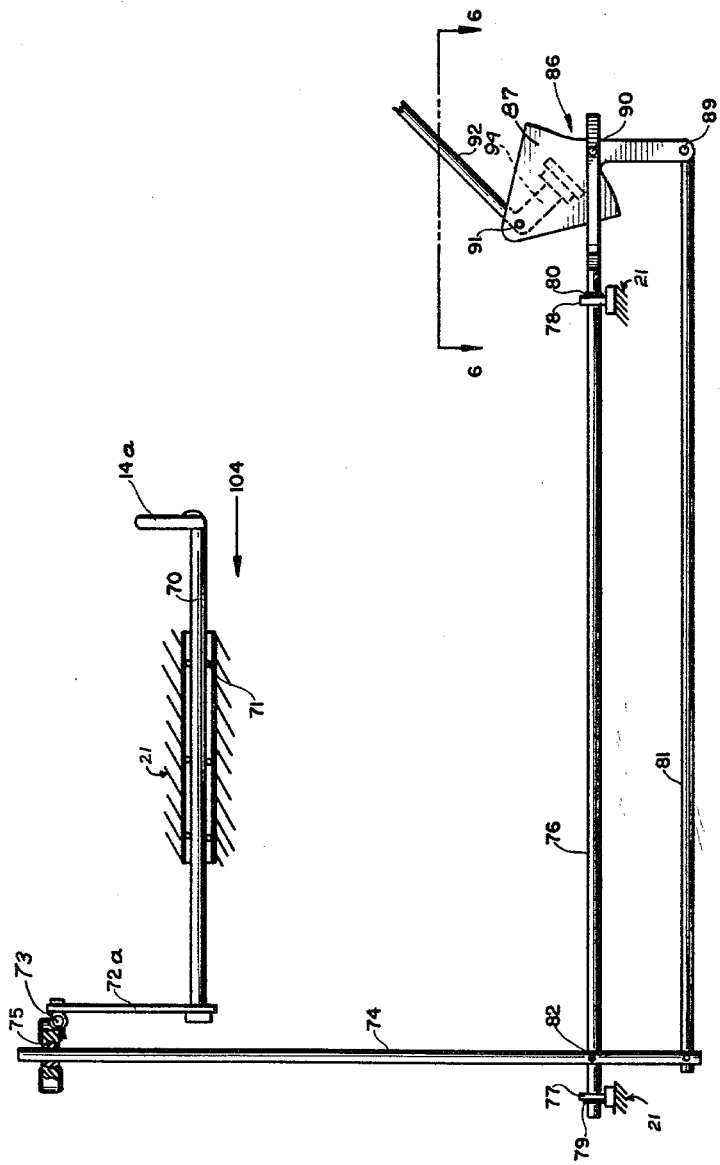

March 23, 1965　　　　M. O. MILES　　　　3,174,708
ROTARY WING AIRCRAFT CONTROL SYSTEM
Filed Aug. 28, 1961　　　　　　　　　　5 Sheets-Sheet 4

INVENTOR.
MELVIN O. MILES
BY
Noel G. Conway
ATTORNEY

March 23, 1965   M. O. MILES   3,174,708
ROTARY WING AIRCRAFT CONTROL SYSTEM
Filed Aug. 28, 1961   5 Sheets-Sheet 5

*INVENTOR.*
MELVIN O. MILES
BY Noel T. Conway
ATTORNEY

United States Patent Office 3,174,708
Patented Mar. 23, 1965

3,174,708
ROTARY WING AIRCRAFT CONTROL SYSTEM
Melvin O. Miles, 16811 Lahey St., Granada Hills, Calif.
Filed Aug. 28, 1961, Ser. No. 134,417
11 Claims. (Cl. 244—17.25)

The present invention relates to an improved control system for a rotary wing aircraft, and more particularly to a control system for changing the plane of rotation of the rotor blades.

Aircraft having overhead rotors may generally be classified into two general classes; namely, those which derive all of their lift from powered overhead blades rotating about a vertical axis and those which include both a horizontally mounted propeller and generally unpowered, overhead rotatable blades. The former type is commonly known in the art as a helicopter whereas the latter type has been referred to as a "rotary wing aircraft" or an "aircraft having autorotative wings." The phrase "rotary wing aircraft," as used in the specification and claims hereinafter, refers primarily to the latter type aircraft but also includes the former class of aircraft.

During the early 1930's, approximately one hundred rotary wing aircraft of the latter type were manufactured and sold, many of which were sold under the trademark "Autogiro." Since that time, relatively little interest has been shown in this type of aircraft notwithstanding its advantages over the airplane for low speed or short distance travel and over the helicopter because of the pure rotary wing aircraft's higher efficiency and lower initial cost. Very recently, however, these advantages have caused a renewed interest in rotary wing aircraft. For a comprehensive review of their present status and also a history thereof see the article entitled "Is the Autogiro Making a Comeback?" by James G. Ray in the January 1960 issue of Flying.

It is a primary object of the present invention to improve rotary wing aircraft by providing an improved direct-controlled system for changing the plane of rotation of the rotor blades. Control systems constructed in accordance with the present invention are accomplishing this by providing greater mechanical advantage for the operator in controlling the attitude of the aircraft and a simplified control system which may be manufactured and sold at a low cost.

Briefly, a preferred embodiment of the present invention includes an elongated substantially cylindrical housing. A shaft rotatably mounted within the housing mounts a rotor blade mounting hub on one end thereof. A spherical bearing mounts one end of the housing to the aircraft fuselage, the other housing end depending substantially below the pivotal point of the blade mounting hub. Control means, including dual control wheels, are coupled to the lower end of the housing for controlling the spatial relation of said housing end relative to the aircraft fuselage. By these means, the said lower housing end is displaced laterally in different directions selectively to thereby change the plane of rotation of the rotor blades.

A more thorough understanding of the invention may be obtained by a study of a the following detailed discussion taken in conjunction with the accompanying drawings in which:

FIGURES 2a and 2b are views in side elevation of a rotary wing aircraft control system constructed in accordance with the present invention, with certain portions broken out and shown in vertical section;

Figure 3:
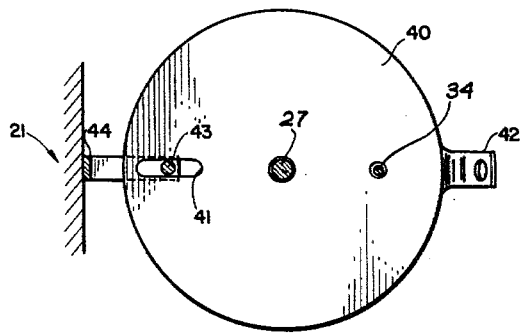
Figure 4:
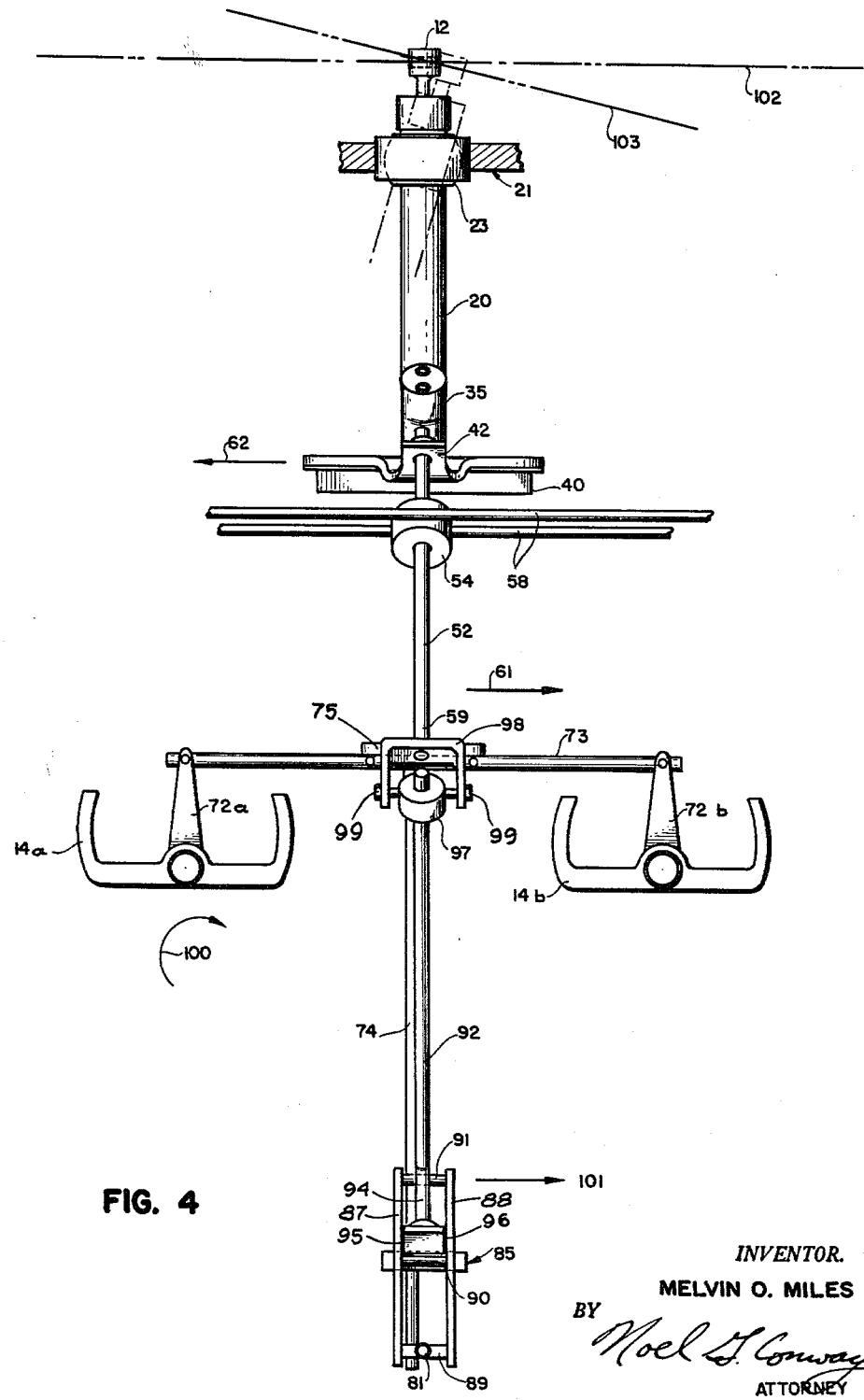
Figure 5:
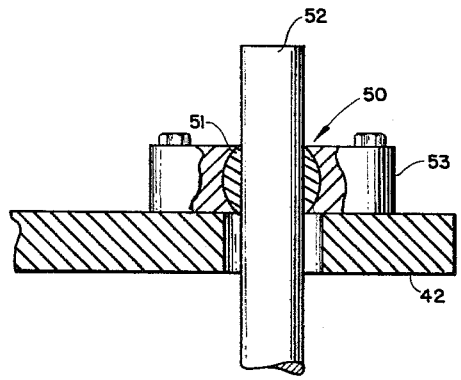
Figure 6:
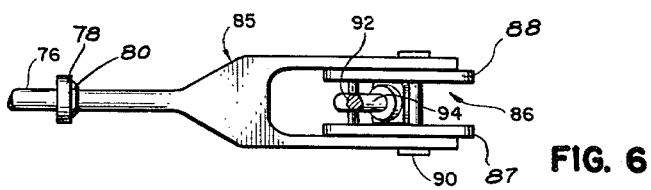

FIGURE 3 comprises a view in vertical elevation of a portion of the system shown in FIGURE 2a;

FIGURE 4 is a rear elevation view of the control system constructed in accordance with the present invention;

FIGURE 5 is an enlarged view, partly in cross section, of a portion of the systems shown in FIGURE 2a;

FIGURE 6 is a view along lines 6—6 of FIGURE 2b; and

Figure 7:
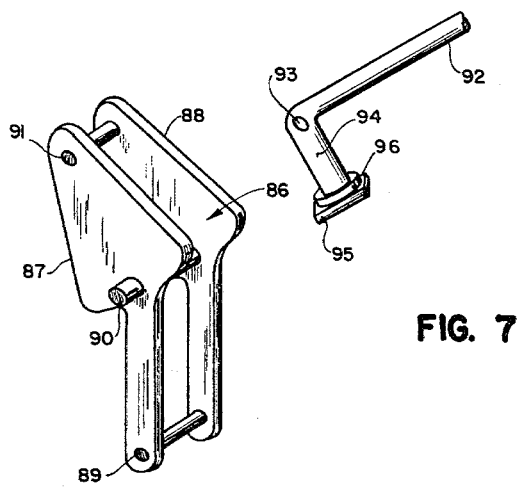

FIGURE 7 is a perspective view of a crank and mating control rod included in the system shown in FIGURE 2b.

Figure 1:
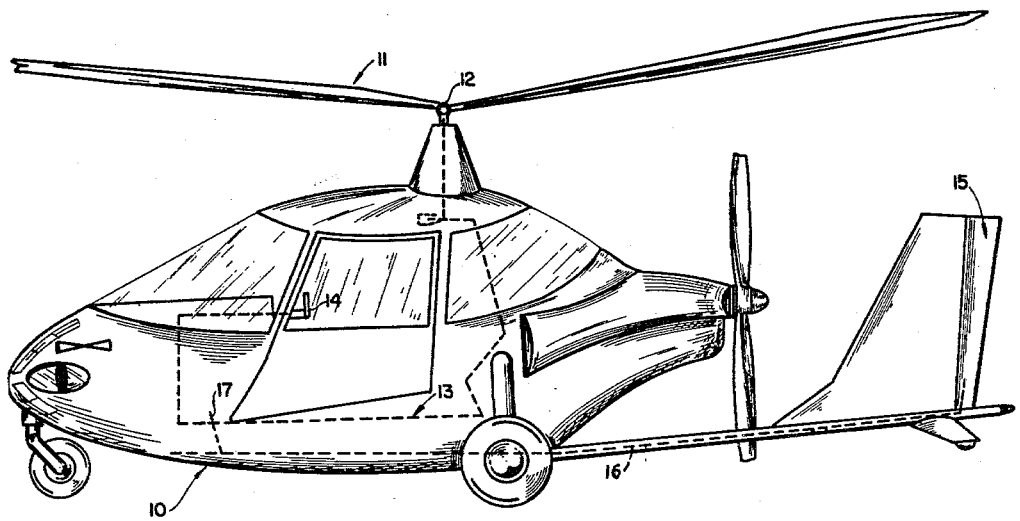
FIGURE 1 is a view in side elevation of a rotary wing aircraft embodying the present invention.

Referring now to FIGURE 1 there is shown a rotary wing aircraft 10 having a two-bladed rotor 11 connected to a hub 12 mounted on the aircraft fuselage so as to have three degrees of rotational freedom with respect thereto. The control system 13 shown generally by a dashed line is connected to a control wheel 14 for operation by a pilot. Changes in position of the craft rudder 15 are obtained from a control system 16 indicated by a dashed line including a foot pedal 17 shown schematically as dashed lines. The rudder control system may embody any one of several structures known in the art and does not comprise any portion of the invention hereinafter described.

A preferred embodiment of a direct control system for a rotary wing aircraft is illustrated in detail in FIGURES 2a, 2b, and 3 to 7. As shown therein, a longitudinal housing 20, preferably cylindrical in shape, is mounted on the aircraft fuselage indicated by the arrow 21. This is accomplished through the use of movable and stationary spherical bearing members 22 and 23 respectively. Preferably, the spherical bearing members are fixed near or adjacent to the upper end of the housing 20 as shown in FIGURE 2a whereby the remainder of the housing may depend below a spherical bearing center 24 about which the housing may be pivoted.

With such mounting, the housing 20 has three degrees of rotary or rotational freedom of movement. In this case I mean that the housing 20 may be pivoted or swung about any one or more of three axes passing at right angles to each other through the spherical bearing center 24.

Secured within the housing 20 at each end thereof are suitable bearings 25 and 26 for rotatably mounting a shaft 27 terminating at one end with an integrally connected mounting hub 12 and at the other end with a spur gear 28. The craft supporting blades 11 are affixed to hub 12 in a conventional manner. Therefore the details of the manner of securing the blades 11 is not shown in detail. It will be understood that the vibrational forces induced in the rotor mounting shaft by lateral movement of the blades 11 in the air during rotation may be reduced by means known in the art. Thus, by way of example only, spring-loaded flap hinges such as disclosed in the Prince Patent No. 2,677,431 may be incorporated between the blades and the hub.

Although not required for normal operation of the rotary wing aircraft, the ability to energize the rotor blades prior to flight is often desirable for the purpose of, for example, substantially reducing the distance required for takeoff. For this reason, a motor 35 is coupled to the hub 12 through a spur gear 36 on shaft 34, mating with the larger spur gear 28 affixed to the shaft 27. This motor may take any one of several forms including, for example, an electrical motor connected to an electrical power source such as a battery (not shown) via conductor wires 37 and 38. Another readily adaptable form of power means is the hydraulic motor.

A relatively flat substantially circular member or plate 40 is rigidly connected to the lower end of the housing 20, i.e., opposite the end connected to the spherical bearing 22. As clearly shown in FIGURES 2a, and 3, plate 40 includes a rectilinear slot 41 in its forward end and an angularly disposed projection 42 at its rearward end. Slot 41 is retained by a bolt or shaft 43 within the confines of a clevis 44 rigidly attached to the fuselage 21 thereby rotatably and translatably mounting one end of the plate with respect to the fuselage.

Plate projection 42 includes a bearing structure 50 shown in detail in FIGURE 5. Bearing 50 comprises a movable spherical bearing portion 51, slidably encircling a control rod 52, and a fixed spherical bearing portion 53 rigidly attached to the projection 42 of plate 40. Bearing 50 thus allows the control rod 52 four degrees of freedom of movement with respect to the plate 40, namely, three degrees of rotary freedom and one degree of translatory freedom. However, as will become apparent in the following description, rotary motion of the control rod 52 about its longitudinal axis is prevented by additional control elements connected at the lower end thereof.

Control rod 52 is mounted so as to have two degrees of rotary, or rotational, freedom with respect to the fuselage 21 by a spherical bearing 54 having a movable element 55 rigidly anchored to airframe members 58 (FIGURE 4). Rod 52 accordingly pivots about point 57, the center of curvature of spherical surfaces 55, 56.

The projection 42 is disposed at the illustrated angle so as to extend approximately at a right angle to a line extending therefrom through the point 24. Also when the plane or rotor blade rotation is horizontal the control rod 52 extends perpendicularly through the hole in the projection. With this arrangement, a simple, straight control rod 52 may be used to accomplish the desired movements of the projection 42 (and therefore the plane of rotation of the rotor blades) in any direction. Additionally, with this arrangement a simple, straight control rod 52 may be used as it extends down rearward of the pilot's seat (see FIGURE 1) in such manner as to not be in the pilot's way.

The operation of the control system so far described is as follows: It will be apparent that the spherical bearing surfaces 22, 23 permit the housing 20 to be swung or pivoted about one or more of three axes extending at right angles to each other through the pivot point 24 and as a result change the plane of rotation of the rotor blades 11 attached to the hub 12. By retaining one end of the plate 40 in the clevis 44, any desired plane of rotation may be imparted to the blades by translating the plate projection 42 in either of two coordinate directions, i.e., right and left or forward and backward in FIGURE 2a or a combination of these motions. This motion is conveniently imparted to the projection 42 by the rod 52. For example, by grasping the lower end 59 of the rod 52 and moving same forward (left in FIGURE 2) as shown by arrow 60, the plate 40 will be translated rearwardly in the opposite direction. Or, by moving end 59 to the right as indicated by arrow 61 in FIGURE 4, the plate 40 will be translated to the left (arrow 62 in FIGURE 4). In similar manner any predetermined movement may be imparted to the housing 20 by suitably translating the end 59 of the rod 52 in any of two coordinate directions in space.

It may thus be observed that the pilot of the craft could control the craft by grasping the lower end 59 of rod 52. However, additional mechanism hereinafter described connects rod 52 to one or more control wheels thereby facilitating control of the craft by the pilot.

As shown in FIGURE 4, a left control wheel 14a and a right control wheel 14b are mounted for one degree of translational and one degree of rotational freedom with respect to the aircraft fuselage. Thus, as shown in FIGURE 2b, control wheel 14a is rigidly attached to the rear end of an axle 70 which may be both rotated and translated in a bearing 71. Control wheel 14b is mounted in a similar manner. At the forward end of each of the axles connected to the respective control wheels are crank arms 72a and 72b whose upper ends are secured together by a cross bar 73 (FIGURE 4). This cross bar is connected to a control rod 74 by means of a spherical bearing 75. Control rod 74 is pivotably mounted by bearing 82 to another axle 76 rotatably mounted with respect to the fuselage 21 via respective bearing members 77 and 78. Collars 79, 80 affixed on both ends of axle 76 prevent translation thereof and so restrain this member to a single degree of rotary freedom. A control rod 81 is pivotally connected to the lower end of control rod 74.

As shown in FIGURE 6, the rear end of axle 76 is bifurcated at 85 so as to embrace a crank member 86. As shown in the perspective detail view of FIGURE 7, crank member 86 comprises a pair of crank shaped plates 87 and 88 fixedly juxtaposed one another by pivot pins 89, 90 and 91. The entire unit is mounted within bifurcation or fork 85 by extensions of pivot pin 90 passing through bearing holes on either side of the fork. One end of the crank member is connected to the rear end of control rod 81 by means of the pivot pin 89. The other end of the crank is pivotably mounted to a short control or connecting rod 92 by means of pivot pin 91 journaled in bearing 93 on the rod 92.

As will become apparent below, the control rod 92 is moved from side to side as well as longitudinally in controlling the aircraft. To reduce the torque on the pivot pin 91 and stabilize the action of rod 92 during operation an integrally attached arm 94 projects at a right angle to control rod 92 and has a pair of bearing surfaces 95 and 96 adapted to engage the inner surfaces of the crank plates 87 and 88.

The bearing surfaces illustrated slide relative to said crank plates with little friction or wear and permit light weight apparatus to accomplish the necessary control. Located near the upper end of the rod 92 is a rotatable collar 97 which is held against longitudinal movement relative to the rod by snap rings (not shown). The collar 97 receives a pair of bolts 99 by which it is connected to a clevis 98 attached to the lower end 59 of control rod 52. Thereby the connection between the control wheels 14a and 14b is completed.

The operation of the complete system shown in FIGURES 2a, 2b, 3, 4, 5, 6, and 7 is as follows: Clockwise rotation of either control wheel 14a, or control wheel 14b (arrow 100 of FIGURE 4) causes control rod 74 to pivot about axle 76 in a clockwise direction, as seen in FIGURE 4, and also pivot crank 86 in a clockwise direction about this same axis. The lower end of short control rod 92 is then translated toward the right (arrow 101 in FIGURE 4). As a result, the end 59 of control rod 52 is also moved to the right (arrow 61 of FIGURE 4) and plate 40 translated to the left (arrow 62 of FIGURE 4). The plane of rotation defined by the rotor blades 11 is thus moved from the horizontal plane indicated by phantom line 102 to the skewed plane indicated by phantom line 103 (FIGURE 4). Correspondingly, counterclockwise movement of either control wheel changes the plane of rotation of the rotor blades in an opposite manner.

Translation of either control wheel in the forward direction (arrow 104 of FIGURE 2b) causes control rod 74 to pivot about bearing 82 thereby translating the lower portion of crank 86 in a rearward direction. The lower end of short control rod 92 is then translated forwardly. As a result, the end 59 of control rod 52 is also moved forwardly whereas plate 40 is translated rearwardly. The plane of rotation of the control blades is thereby moved from the horizontal plane indicated by phantom line 102 to the skewed plate indicated by phantom line 105.

It will be apparent that an opposite movement of the control wheel, i.e., in the rearward direction, results in shifting the plane of rotation of the blades in the opposite direction. A combination of the rotary and translatory movements of the control wheels will change the plane of rotation of the rotor blades to any desired position.

The improved control system hereinabove described in considerably simpler to construct than those presently known in the art. Another important feature thereof is that the control mechanism is connected considerably below the pivot point of the rotor blade mounting hub. This construction substantially increases the mechanical advantage for the operator thus enabling lighter weight control linkage to accomplish the task.

Although only one exemplary embodiment of the invention has been disclosed and described, it will be understood by those skilled in this art that other applications of the invention are possible and that the embodiment disclosed may be subjected to various changes, modifications and substitutions without departing from the spirit of the invention. Therefore, the invention is to be limited solely by the appended claims.

I claim:

1. A control system for a rotary wing aircraft comprising:
   a control wheel mounted for one degree of rotational and one degree of translational freedom with respect to the aircraft fuselage;
   a crank coupled to said control wheel and rotated and translated therewith;
   a first control rod pivoted to a second rotatably mounted control rod;
   means responsively connecting said first control rod to said crank;
   a third control rod pivoted to said first control rod;
   a crank-shaped member having a mid portion pivotably mounted to and rotated by said second control rod and an end portion pivotably connected to said third control rod;
   a fourth control rod having one end pivotably connected to the other end of said crank-shaped member;
   a fifth control rod coupled to the other end of said fourth control rod;
   means for mounting said fifth control rod at a mid portion with at least two degrees of rotational freedom with respect to the aircraft fuselage;
   a member having one portion rotatably and translatably mounted with respect to the aircraft fuselage and another portion connected to the other end of said fifth control rod so as to have at least two degrees of rotational freedom and one degree of translational freedom therewith, a substantially cylindrical housing having its lower end rigidly connected to said member and its upper end mounted with three degrees of rotational freedom with respect to the fuselage, and a rotor blade mounting hub mounted for rotation on a fixed axis relative to said housing whereby that a translational movement of said control wheel causes the axis of rotation of said hub to change in a predetermined direction with respect to said fuselage and a rotational movement of said control wheel causes a predetermined change in direction of the axis of rotation of said hub in a direction at a right angle to said first movement.

2. A control system for rotary wing aircraft comprising: a relatively longitudinal housing having one end mounted on the aircraft fuselage so as to have three degrees of rotational freedom therewith and the other end suspended below the center of rotation of said housing; a rotor blade mounting hub rotatably mounted on said housing at said one end;
   a plate fixedly connected to said other end of the housing with the plane of the plate being substantially perpendicular to the axis of the housing;
   means rotatably and translatably connecting one end of said plate to said fuselage;
   a control rod extending in a generally vertical direction; first bearing means connecting the upper end of said control rod to said plate at a point opposite said one plate end so that said control rod will have two degrees of rotational freedom and one degree of translational freedom with respect to that plate;
   second bearing means mounting said control rod at a midpoint thereof on the aircraft fuselage so as to limit motion of the control rod relative to said fuselage to two degrees of rotational freedom;
   and means connected to the lower end of said control rod for selectively imparting movement to said rod lower end, whereby an aviator can control the plane of rotation of said rotor blade mounting hub by selectively imparting movement to said lower end of said control rod.

3. The control system defined in claim 2 including:
   a control wheel;
   means for rotatably and translatably mounting said control wheel with respect to the aircraft fuselage;
   and means connecting said control wheel to the lower end of said control rod so that said lower end is translated in a forward and reverse direction when said control wheel is translated in like manner and in a right and left direction when said control wheel is rotated in clockwise or counter-clockwise directions respectively.

4. The control system defined in claim 2 including:
   means coupled to the lower end of said control rod for converting a rotational control movement about one rotational axis and a translational control motion in one coordinate direction into translational motion of said lower end of said control rod in two coordinate directions.

5. The control system defined in claim 4, wherein said last named means includes:
   a first control member rotated in accordance with the rotational control movement;
   a second control member translated in accordance with the translational control movement;
   a crank-shaped member having a central portion swingably attached to said first control member for movement about an axis extending at a right angle to the axis of rotation of said first control member; said crank member being attached so as to rotate with said first control member, said crank-shaped member having one end portion connected to said second control member;
   and means connected to another end portion of said crank-shaped member for transmitting movement thereof to the said lower end of said control rod and thereby provide the desired control movement in two coordinate directions.

6. A control system defined in claim 5 wherein said last mentioned means is a connecting rod connected at one to said other end of the control rod and connected at a second end to said another end portion of said crank-shaped member, said connecting rod having at its second end an arm projecting therefrom at a large angle, said arm having bearing means slidably engaging at least one surface of said crank-shaped member so as to substantially reduce torque applied to the pivot point of said member with respect to the crank-shaped member.

7. In combination with a rotary wing aircraft having a cockpit, a rotary wing control system comprising:
   a relatively longitudinal housing having an upper end mounted with respect to the aircraft fuselage so as to have three degrees of rotational freedom and a lower end having a plate affixed to it that is rotatably and translatably attached to the aircraft fuselage, the lower end of the housing being substantially below the upper end of the housing;
   means within the housing for mounting a hub having rotary blades which are adapted to furnish lift to the aircraft, said hub being in close proximity to the upper end of the housing, a control implement in the front of said cockpit having an upper end movable in two coordinate directions by a pilot in said cockpit;

and mechanical linkage means connecting said plate to said control implement so that movement of the upper end of the implement in one direction moves said lower housing end in the opposite direction, said linkage means consisting of rigid links swingably joined together, whereby the control system may be operated in the same manner as the conventional fixed wing aircraft.

8. The combination set forth in claim 7 wherein said cockpit has a floor, said control implement is located at the forward end of the cockpit and is spaced above the floor of the cockpit;

said housing is located at a point to the rear of the cockpit, and said linkage means extends down from said housing down under the floor of the cockpit and forward to the front end of the cockpit and then up to said control implement.

9. In combination with an aircraft fuselage having a cockpit, a control system for rotary wing aircraft comprising:

a relatively longitudinal housing having one end mounted on the aircraft fuselage so as to have three degrees of rotational freedom therewith and the other end suspended below the center of rotation of said housing;

a rotor blade mounting hub rotatably mounted on said housing at said one end;

a plate fixedly connected to said other end of the housing, said plate extending laterally from the axis of the housing;

means rotatably and translatably connecting one point of said plate to said fuselage;

a control rod extending in a generally vertical direction;

bearing means connecting the upper end of said control rod to said plate at another point substantially displaced from said one point on said plate;

a control implement in the front of said cockpit adapted to be grasped by a pilot, said control implement having an upper end movable in two coordinate directions by a pilot grasping the implement;

and mechanical linkage means connecting said control rod with said control implement such that movement of the upper end of the implement in one direction moves the upper end said control rod in the opposite direction, said linkage means consisting of rigid links swingable joined together, whereby the control system may be operated in the same manner as the conventional fixed wing aircraft.

10. In combination with a rotary wing aircraft having a cockpit, a rotary wing control system comprising: a relatively longitudinal housing having an upper end mounted on the aircraft fuselage so as to have three degrees of rotational freedom therewith and a lower end suspended below the center of rotation of said housing;

a rotor blade mounting hub rotatably mounted on said housing at said upper end;

a plate fixedly connected to said lower end of the housing with the plane of the plate being substantially perpendicular to the axis of the housing;

means movably connecting said plate to said fuselage at a first point on said plate, which point is displaced from the axis of said housing;

a control rod extending in a generally vertical direction;

first bearing means connecting the upper end of said control rod to said plate at a point opposite said one point on said plate so that said control rod will have two degrees of rotational freedom with respect to the plate;

second bearing means and third bearing means connected to said control rod, one of said bearing means being connected to the control rod at its lower end and the other of said bearing means being connected to the control rod at a mid-point thereof;

means mounting said second bearing means so that it will remain relatively stationary with respect to the aircraft fuselage;

and means connected to said third bearing means for selectively imparting motion to said third bearing means and therefore the rod at the point of connection between said third bearing means and the rod, whereby an aviator can control the plane of rotation of said rotor blade mounting hub by selectively imparting movement to said third bearing means.

11. In combination with a rotary wing aircraft having a cockpit, and a rotary wing control system comprising:

a relatively longitudinal housing having an upper end mounted with respect to the aircraft fuselage so as to have three degrees of rotational freedom, the lower end of the housing being substantially below the upper end of the housing, said housing being located at a point to the rear of the cockpit;

means within the housing for mounting a hub having rotary blades which are adapted to furnish lift to the aircraft, said hub being in close proximity to the upper end of the housing;

said cockpit having a floor;

a control implement located at the forward end of the cockpit and spaced above the floor of the cockpit, said control implement having an upper end movable in two coordinate directions by a pilot in said cockpit, said control implement including:

a control wheel mounted on bearing means secured to said fuselage, said bearing means having an axis parallel to the longitudinal axis of the fuselage, said bearing means limiting said control wheel to rotational movement around the bearing axis and translational movement along said bearing axis;

and mechanical linkage means connecting the lower end of said housing with said control implement such that movement of the upper end of the implement in one direction moves the lower housing end in an opposite direction, said linkage means consisting of rigid links swingably joined together, said linkage means extending down from said housing down under the floor of the cockpit and forward to the front end of the cockpit and then up to said control implement, whereby the control system may be operated in the same manner as a conventional fixed wing aircraft.

References Cited in the file of this patent

UNITED STATES PATENTS

| | | |
|---|---|---|
| 1,435,190 | Leggelo | Nov. 14, 1922 |
| 1,578,833 | Kogler | Mar. 30, 1926 |
| 2,074,342 | Platt | Mar. 23, 1937 |
| 2,404,014 | Thornes | July 16, 1946 |
| 2,434,276 | Laskowitz | Jan. 13, 1948 |
| 2,569,882 | Bothezat | Oct. 2, 1951 |
| 2,806,662 | Yonkers | Sept. 17, 1957 |
| 2,861,641 | Bensen | Nov. 25, 1958 |
| 2,879,956 | Brand | Mar. 31, 1959 |
| 2,886,261 | Robert et al. | May 12, 1959 |

FOREIGN PATENTS

| | | |
|---|---|---|
| 598,877 | Great Britain | Feb. 27, 1948 |